United States Patent [19]
Hume et al.

[11] Patent Number: 5,209,851
[45] Date of Patent: May 11, 1993

[54] REMEDIATION METHODS FOR TOXIC MATERIALS

[76] Inventors: Frank C. Hume, 2905-15th Avenue, Prince George, B.C., Canada, V2N 1T3; Alan A. Downie, 2140 West 6th Avenue, Vancouver, B.C., Canada, V6K 1V6

[21] Appl. No.: 713,913

[22] Filed: Jun. 11, 1991

[51] Int. Cl.$^5$ .............................................. C02F 3/00
[52] U.S. Cl. ........................... 210/610; 423/DIG. 17; 435/315; 435/262; 435/821
[58] Field of Search ............... 210/601, 609, 610, 611, 210/619, 620, 632; 423/DIG. 17; 588/205–207; 435/313, 316, 821, 315, 302, 262, 299

[56] References Cited

U.S. PATENT DOCUMENTS 5,057,284 10/1991 Emmett et al. ............. 423/DIG. 17
5,078,882 1/1992 Northrup ..................... 210/610

FOREIGN PATENT DOCUMENTS 1182227 2/1985 Canada ............................ 362/16

*Primary Examiner*—Bernard Nozick
*Attorney, Agent, or Firm*—Townsend and Townsend, Khourie and Crew

[57] ABSTRACT

Remediation of toxic waste materials in solid, liquid or a mixture of solid and liquid form provides rapid reduction of the toxic conditions to innocuous levels. The process utilizes indigenous microorganisms present in the waste materials. The process comprises contact mixing waste materials with protein nutrients in water, air entraining the waste materials and protein nutrients during mixing to form a bioactive structure, and exposing the bioactive structure to cure in air until the toxic materials are remediated to a predetermined innocuous level.

15 Claims, 3 Drawing Sheets

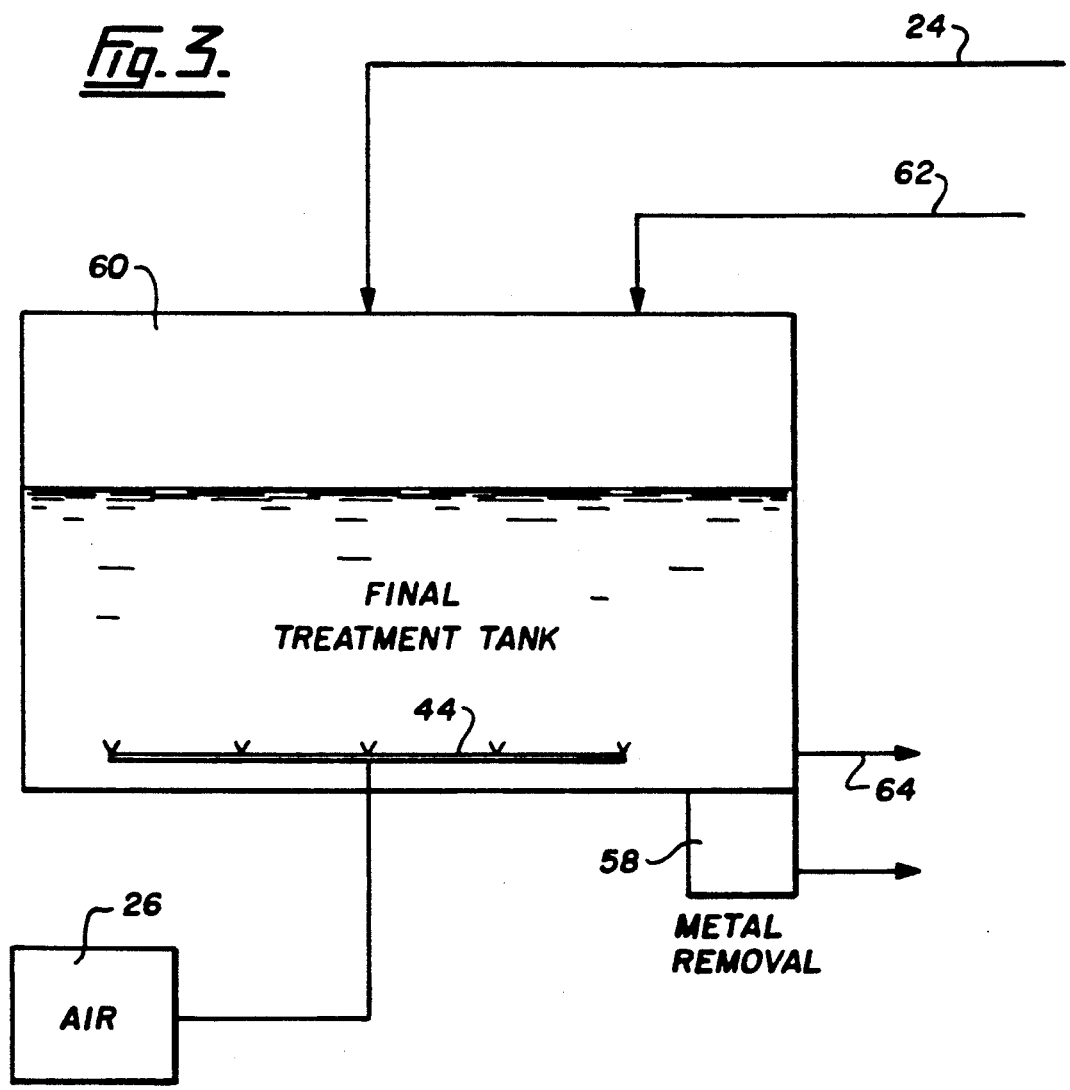

REMEDIATION METHODS FOR TOXIC MATERIALS

TECHNICAL FIELD

The present invention relates to remediation of toxic waste materials in solid form or in solid and liquid form. More specifically, the present invention relates to a process for treating toxic waste materials with nutrients to remediate the contaminated material and efficiently reduce the toxic conditions to innocuous levels.

BACKGROUND ART

Conventional disposal methods for solid toxic wastes are landfills and include incineration, the application of engineered bacteria, land farming or simply removal to another area. The latter method does not resolve the problem but merely delays a problem that has to be handled at a later time.

One method of treating waste water utilizing an aerating process is disclosed in Canadian Patent 1,182,227 to Hume, issued Feb. 5, 1985. In this process, effluent is treated such that substantially no sludge is formed. Toxic effluent is first skimmed to remove floating oil and other solids. The effluent is then vigorously mixed and aerated so the waste material present in the effluent is maintained in suspension such that minimum flocculation occurs. The mixing and aeration continues for a sufficient period of time to permit remediation of a substantial portion of the waste material. The mixed and aerated effluent is then passed through an oxidation basin or basins for reduction of substantially all the remaining portion of the waste material.

DISCLOSURE OF INVENTION

The present invention relates to the treatment of waste materials in solid and/or liquid form using native or indigenous microorganisms. No engineered microorganisms are required. The remediation occurs rapidly, for some materials in a matter of hours, other materials require a matter of days. Previous reduction systems can require months or years. In the process, toxic waste materials, which may be in solid form, liquid form or in solid and liquid form, are contact mixed with nutrients in water and then exposed to the action of air to ensure oxygen is always present. The combination of air and the nutrients in contact with the indigenous microorganisms in the toxic wastes provide a bioactive structure which rapidly remediates to specified levels.

The type of toxic wastes to be treated include soils that have become toxic through contact with contaminants such as PCBs, oils, creosotes and other organic or petroleum based products. It is first necessary to excavate the soils which are contaminated. Water and nutrients are added to form a homogeneous mass which is then mixed and at the same time exposed to the action of air. After mixing and air entrainment, the waste materials are stockpiled or laid out so that curing occurs with no toxic leachate.

Where heavy contamination is present, a rinse cycle is employed to remediate contaminated water, nutrients, and in some cases surfactants, which are added to the toxic wastes. The contaminated rinse liquids are remediated in a recycle treatment tank, a final treatment tank or tanks.

The solid waste materials are preferably screened to avoid oversized materials from damaging the process equipment. Crushing, grinding or shredding may be necessary, and oversized materials that cannot easily be processed are sprayed with liquid nutrient and water and stacked or piled up for curing.

In the case where contaminated liquid in substantial volume is together with solid toxic waste material, two systems are arranged side-by-side. One system is primarily for liquids, which may be liquids from a solids contact mixing phase. The liquid remediation system is similar to that disclosed in Canadian Patent 1,182,227 and both liquids and solids can be recycled between the two systems. In this way metals may be removed from the waste materials. The heavy molecules of the nutrients assist in the process of precipitating the metals for mechanical removal from the liquid treatment system.

The present invention provides a process for treating toxic waste materials contaminated with organic substances comprising the steps of: contact mixing solid waste materials with protein nutrients in water, air entraining the solid waste materials and protein nutrients during mixing to form a bioactive structure, exposing the bioactive structure to cure in air until the toxic waste materials are remediated to a predetermined innocuous level.

Definitions of terms used throughout the specification and claims are as follows:

Biological degradation, or biodegradation is the molecular degradation of an organic substances resulting from the complex action of living organisms, and in the present application indigenous microorganisms. Toxic materials are biodegraded to innocuous metabolites by these indigenous microorganisms. Biodegradation and/or detoxification is referred to as remediation or treatment throughout the present text. The remediation process is a combination of enzyme catalyzed reactions which proceed to or proceed with biodegradation to resultant, less toxic metabolites.

Nutrients include hydrolized protein nutrients composed of naturally occurring amino acids. The nutrients also include enzymes which are complex proteins ubiquitous in nature and have additional chemical bonds that stabilize fixed macromolecular geometries that are involved in enzyme reaction.

Surfactants, surface active agents, may be used with some waste materials to reduce interfacial tension between liquids and between liquids and solids. The surfactants are selected for their detergency, emulsifying and dispersing qualities. All surfactants must be compatible with the nutrients to ensure the remediation process is not reduced.

Bioactive structure includes a cellular bubbled configuration of air, nutrients, active indigenous microorganisms all in contact with the pollutants to enhance remediation. This structure is created within the solids mass or as a stable surface floating froth on the liquid.

Curing means the disposition of the bioactive structured solids in a manner to allow further remediation (biodegradation - detoxification) at acceptable ambient or artificially controlled temperatures.

In another embodiment, the present invention provides a process for treating toxic recycled rinse liquids from the treatment of solid waste materials with protein nutrients in water, comprising the steps of contact mixing and air entraining with protein nutrients in water to form a stable surface bioactive structure to remediate the rinse liquids to a predetermined innocuous level for authorized disposal.

BRIEF DESCRIPTION OF DRAWINGS

In drawings which illustrate embodiments of the invention,

FIG. 3 is a flow sheet showing a process according to a further embodiment of the present invention for treating the rinse liquids in a final treatment tank.

BEST MODES FOR CARRYING OUT THE INVENTION

Waste material sites must first be examined to determine the treatability of the material. Laboratory analysis and pilot tests are required to select an effective and economic treatment configuration. Samples of the waste material are treated with different nutrients in various concentrations and set out to cure. Tests are taken at curing times, for example, zero time up to seven days, and the results tabulated. From these results, variation in the nutrient content to be added, times, etc., are determined. Furthermore, the reduction in toxicity is determined based on the authoritative requirements for a particular toxic material.

Many toxic materials on waste sites include a homogeneous mass of liquid and solids. Soils that have been soaked with oil products or oil related products such as PCBs, creosote, etc., are first excavated and then if necessary crushed or ground to increase the active surface area of the contaminated particles.

Figure 1:
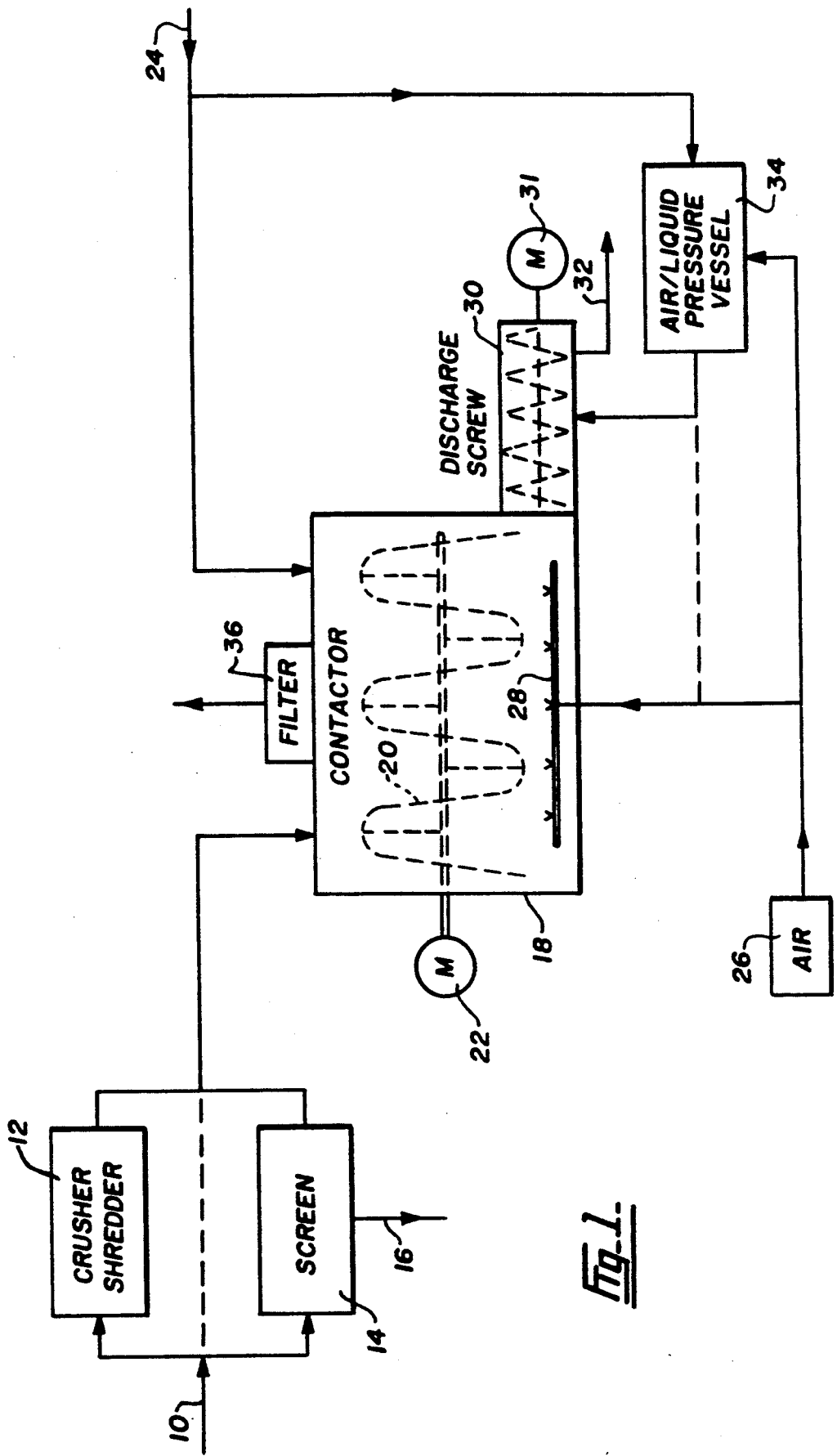
FIG. 1 is a flow sheet showing a process according to one embodiment of the present invention for treating toxic solid waste materials.

As shown in FIG. 1, waste material 10 is crushed, ground or shredded in a suitable apparatus 12. The material 10 may be screened in a screen 14 to remove oversized materials 16. These oversized materials 16 may be remediated by wetting with protein nutrients in water and leaving to cure on site. In some cases crushing and screening is not required, in which case the material is fed directly to a contactor container 18 which has a mixer, preferably a ribbon mixer 20 therein driven by a motor 22. Whereas a ribbon mixer 20 is shown, paddle mixers, auger mixers or other types of known contact mixers may be used. In one case an auger screw may be provided to move the material through the container 18 and out at a discharge. Protein nutrients in water 24 are added to the contactor container 18, and at the same time a compressed air source 26 provides compressed air through an air entrainer 28 at the bottom of the contactor container 18.

Sufficient liquid is added to form a homogeneous mass of solid waste material and the air entrainment causes the material to form bubbles of air within the mass. The time of contact mixing can vary depending upon the particular material being treated and the type of mixer used.

A bioactive structure is formed in the mixing stage, the air bubbles provide about a 20 to 50% increase in volume for solids.

After the mixing step, the bioactive structure is removed from the container 18. In some cases the container may have a discharge chute or a discharge screw powered by motor 31 removes the bioactive structure at exit 32 where the treated material is stockpiled or laid out for further curing in air. The discharge screw 30 in one embodiment has added to it protein nutrients in water which have been entrained with air by air entrainment system 34. In some instances air entrained protein nutrients in water are also added to the entrainer 28 as shown in the dotted line in FIG. 1. The contactor container 18 has an air filter 36 at the top to prevent possible contaminated air escaping.

After the bioactive structure has been laid out in air, it is left to cure. Temperatures preferably in the range of 50° to 90° F. permit remediation of the structure down to innocuous levels of toxicity generally in about 4 to 21 days although the curing time is dependent on a number of variables, primarily ambient temperature, and varies from site to site. The treatment appears to proceed via an enzyme-catalyzed reaction leading to biodegradation to less toxic metabolites.

The basic protein nutrients are hydrolized protein materials and, in some cases, include surfactants depending on the ease or otherwise of wetting the contaminated waste material satisfactorily. Indigenous microorganisms present in the toxic materials are utilized. Good contact-between the waste material and the protein nutrients and water solution is necessary for the effectiveness of the process. The selection of the protein nutrient, the concentration in a water solution and the option, selection and concentration of the surfactant is also determined by tests on the waste material prior to the process. The protein nutrient is selected from a number of protein nutrient sources including powdered cow's milk, soya bean oil, soya bean meal, fish oil, fish meal, rendering plant byproducts, slaughterhouse byproducts, brewery residues and brewery bottoms. The selection of protein nutrient is made after initial tests in a laboratory and on the site.

Gravel, sand, silt and clay may all be treated by this process. In the past, silt and clay have been difficult to treat, but they may be processed according to the present invention.

In some cases where heavy contamination is apparent, excess water is added to the solid waste material and a rinse cycle takes place where the contaminated rinse liquid is treated.

Figure 2:
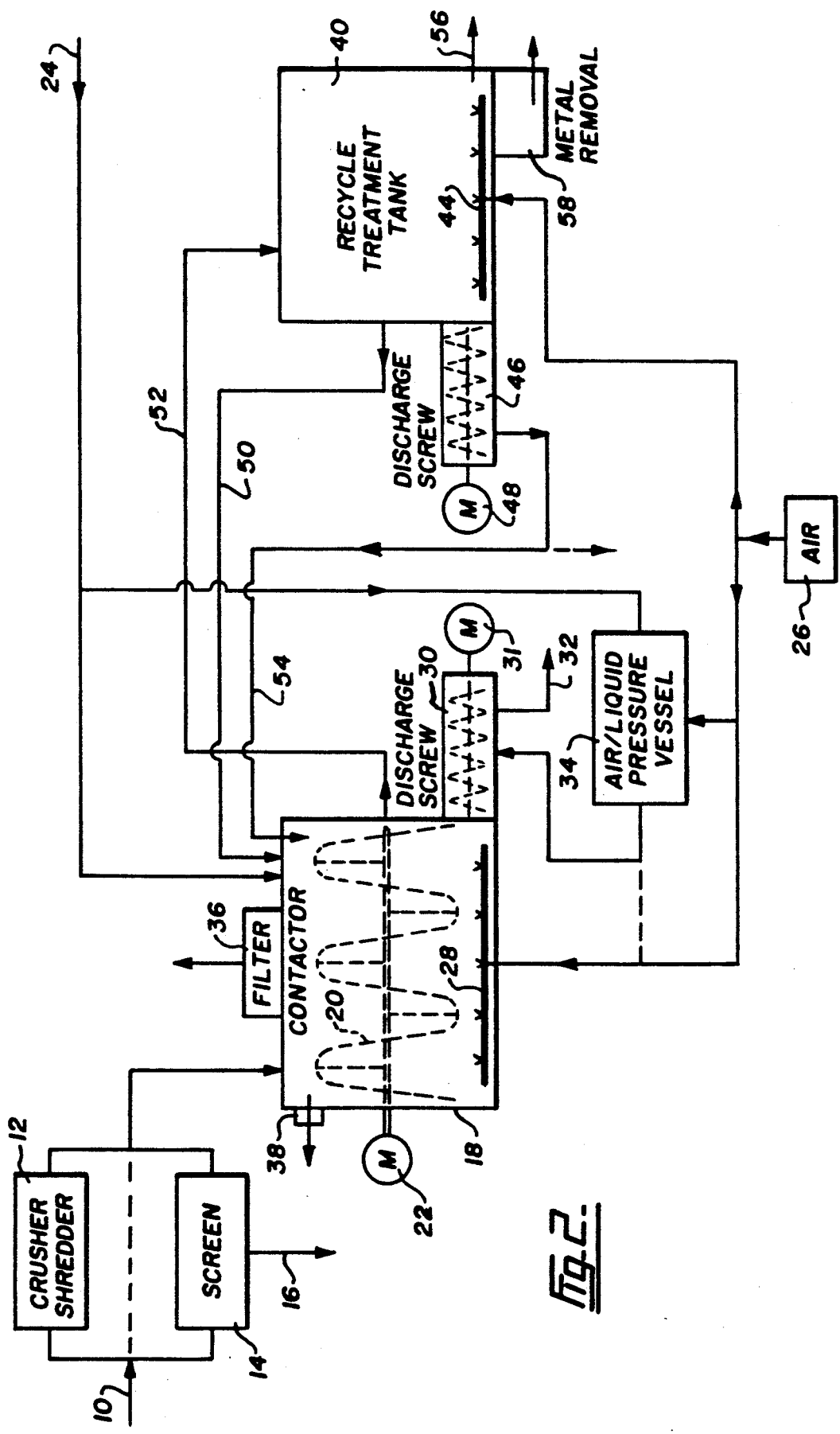
FIG. 2 is a flow sheet showing a process according to another embodiment of the present invention for treating toxic rinse liquids from the treatment of toxic solid waste materials in a recycle treatment tank.

As shown in FIG. 2 a recycle treatment tank 40 is provided for an input of contaminated rinse liquid 52. The recycle treatment tank 40 has an aerator 44 fed from the air supply 26 and a discharge screw 46 driven by motor 48. Protein nutrients and water 24 are added to the recycle treatment tank 40. The liquid from the recycle treatment tank 40 is recirculated through line 50 to the contactor container 18 and then further recycled back through line 52 into the recycle treatment tank 40. Solids that build up in the recycle treatment tank 40 pass through the discharge screw 46 and are recirculated back to the contactor container 18 through line 54. In another embodiment the solids from the discharge screw 46 leaving the recycle treatment tank 40, instead of being recycled, go to disposal and may be laid out or stockpiled for further curing. After treatment specification liquid from the recycle treatment tank 40 passes through outlet 56 to an authorized disposal. Any heavy metals that are released during the processes, drop into the metal removal container 58 for removal from the recycle treatment tank 40.

Any liquid such as oil that settles above the solids in the contactor container 18, is removed at outlet 38 and may be remediated in the recycle treatment tank 40.

Recirculation of liquid between the contactor 18 and the treatment tank 40 and the addition of the protein nutrients in water creates a stable surface bioactive structure.

In another embodiment the recycled contaminated rinse liquids 52 from the contactor container 18 or from the recycle treatment tank 40 are fed to a final treatment tank 60 as shown in FIG. 3, through line 62. Liquid such as oil removed from the contactor container 18 from outlet 38 may also be fed to the final treatment tank through line 62. The final treatment tank 60 has an aerator 44 fed from the air supply 26. Protein nutrients and water 24 are added to the final treatment tank 60 and air is entrained into the liquids in the final treatment tank 60. Oil on the top of the liquid in the final treatment tank 60 is bioactively structured. Metals in the oil products chelate and drop to the bottom of the final treatment tank 60 where they are collected in the metal removal 58. After treatment the remediated liquid passes through outlet 64 to authorized disposal.

The application of the process can all occur at a site. Commercially available equipment may be utilized with little or no modification needed. The protein nutrients and their concentration in water, the surfactants and their concentration, and the crushing, grinding or shredding requirements are all determined for a specific site.

EXAMPLE 1

At one waste site the pollutant in soil was gasoline/diesel fuels and the soil was a silty clay with sand. The analysis of the pollutant was modified EPA 8015 for Total Fuel Hydrocarbons, and EPA 8020 for benzene, toluene, xylene and ethyl benzene. Contamination levels often exceeded 5,000 ppm, total fuel hydrocarbons and the requirement was to reduce the overall concentration to less than 100 ppm and eliminate the strong odour associated with this contamination. EPA methods to determine contaminants are standards adopted by laboratories (see Brown and Caldwell Laboratories Technical Fact Sheet No. 2).

A batch mixing method was employed according to the arrangement shown in FIG. 1. Over 200 cubic yards of soil were treated per day. The temperature was ambient varying from 50° to 90° F., and after mixing, which occurred in less than five minutes per batch, curing proceeded for four days with resultant contaminant levels consistently reduced to less than 100 ppm. Air monitoring during the process failed to detect any release of contaminant volatiles during the mixing or curing of the treated materials. This example treated only solid toxic materials.

EXAMPLE 2

In this example the waste materials included polychlorinated biphenyls (PCBs) Aroclor 1254. The analysis was EPA 8080. The waste material was very fine greenish silty sediment and very dusty with the dry density of flour. The site was a dried cooling tower blow-down pond located at a natural gas compressor station. The process was the same as disclosed in Example 1. The material was treated and analysis conducted before treatment and at 1, 3, 7 and 14 days of curing time. The PCB contamination ranged from 183 to 77 ppm in the original material and the PCB contamination after 14 days ranged from 2.5 to 1.3 ppm with the isomer shifting to the chromatographic signature of Aroclor 1260.

EXAMPLE 3

A test was conducted to investigate the effectiveness of the process to detoxify coal tar deposits. The material was coal tar saturated soil sediments. The pollutants were polynuclear aromatic hydrocarbons (PAH) namely, naphthalene, anthracene, acenaphthene, plenanthrene, methylated naphthalenes, etc. The analysis was EPA 8240 and EPA 8270 (8 various MAH's and 17 various PAH's).

The method of treatment was the same as that disclosed in Example 1. The material was treated and analysis conducted before treatment and at 1, 4, 7, and 14 days of curing time. The total volatiles were reduced from 8,900 ppb on day 1 to 35 ppb on day 14. The total base/neutrals were reduced from 5,927 ppm on day 1 to 839 ppm on day 14. The results shows that two, three, four and five-ring compounds were degraded 96 percent, 88 percent, 55 percent and 44 percent respectively, in a period of 14 days.

EXAMPLE 4

A spill disposal pit containing heavy fuel oils (Bunker C) was tested to treat both solid and liquids and the system used was that disclosed in FIG. 2. The material was fine sand with clay lenses and the analysis was polynuclear aromatic hydrocarbons (PAH), total organic carbons (TOC) and total petroleum hydrocarbons (TPH). A full scale pilot test was run for four days. Both solids and liquids were treated. Analysis was conducted immediately at the start of the treatment and then at one and four days of solids curing and liquid treatment. The results were as follows.

TABLE

| Sample Analysis | PAH | TOC | TPH | (ppm) |
|---|---|---|---|---|
| Day 0 before | 550 | 2,500 | 20,000 | |
| Day 0 after | ND | 1,500 | 7,500 | |
| Day 1 | ND | 1.5 | 13.0 | |
| Day 4 | ND | 1.0 | 9.8 | |

ND indicates Not Detectable

Rinse water had polynuclear aromatic hydrocarbons concentrations reduced from 2,388 ppb on day 1 to 39 ppb on day 4 and was subsequently discharged through an industrial sewage system.

The embodiments of the present invention in which an exclusive property or privilege is claimed are defined as follows:

1. A process for treating toxic waste materials contaminated with organic substances comprising the steps of:
   contact mixing toxic waste materials, which include indigenous microorganisms, with protein nutrients in water,
   air entraining the toxic waste materials and protein nutrients during mixing to form a bioactive structure, and
   exposing the bioactive structure to cure in air until the toxic waste materials are remediated to a predetermined innocuous level.

2. The process of treating toxic waste materials according to claim 1 wherein sufficient protein nutrients in water is mixed with the toxic waste materials and air entrainment to form a bioactive structure.

3. The process for treating toxic waste materials according to claim 1 wherein the toxic waste materials comprise solid waste materials and the solid waste materials are reduced to increase surface areas and do not exceed a predetermined size.

4. The process for treating toxic waste materials according to claim 2 including screening the solid waste materials to remove materials above a predetermined size.

5. The process for treating toxic waste materials according to claim 3 wherein the solid waste materials are reduced by crushing.

6. The process for treating toxic waste materials according to claim 3 wherein the solid waste materials are reduced by grinding.

7. The process for treating toxic waste materials according to claim 3 wherein the solid waste materials are reduced by shredding.

8. The process for treating toxic waste materials according to claim 1 wherein the mixing occurs in a container with a contact mixer selected from the group consisting of paddle mixer, auger mixer and ribbon mixer.

9. The process for treating toxic waste materials according to claim 8 wherein the remediated waste materials are removed from the container by a discharge screw.

10. The process for treating toxic waste materials according to claim 9 wherein air is entrained with nutrients in water and fed to the discharge screw.

11. The process for treating toxic waste materials according to claim 1 wherein the protein nutrients comprise hydrolysed proteins.

12. The process for treating toxic waste materials according to claim 11 wherein the hydrolysed proteins are selected from the group consisting of powdered cows' milk, soya bean oil, soya bean meal, fish oil, fish meal, rendering plant byproducts, slaughterhouse byproducts, brewery residues and brewery bottoms.

13. The process for treating toxic waste materials according to claim 11 including at least one surfactant with the hydrolysed proteins to reduce interfacial tension during the contact mixing.

14. The process for treating toxic waste materials according to claim 1 wherein the toxic waste materials are mixed with nutrients in excess water in a first tank having contact mixing means and air entraining means therein, and contaminated rinse liquids from the first tank are contact mixed and air entrained with protein nutrients in water in a second tank to a predetermined innocuous level for authorized disposal.

15. The process for treating toxic waste materials according to claim 14 wherein liquids are recirculated between the first tank and the second tank.

* * * * *